US011106443B2

(12) United States Patent
Lang et al.

(10) Patent No.: US 11,106,443 B2
(45) Date of Patent: Aug. 31, 2021

(54) OPERATING SYSTEM INSTALLATION (71) Applicant: New H3C Information Technologies Co., Ltd., Zhejiang (CN)

(72) Inventors: Lina Lang, Beijing (CN); Yahui Di, Beijing (CN); Feng Shi, Beijing (CN)

(73) Assignee: New H3C Information Technologies Co., Ltd., Zhejiang (CN)

( * ) Notice: Subject to any disclaimer, the term of this patent is extended or adjusted under 35 U.S.C. 154(b) by 0 days.

(21) Appl. No.: 16/634,113

(22) PCT Filed: Jul. 26, 2018

(86) PCT No.: PCT/CN2018/097214
§ 371 (c)(1),
(2) Date: Jan. 24, 2020

(87) PCT Pub. No.: WO2019/020073
PCT Pub. Date: Jan. 31, 2019

(65) Prior Publication Data
US 2020/0210163 A1 Jul. 2, 2020

(30) Foreign Application Priority Data
Jul. 28, 2017 (CN) .......................... 201710632057.7

(51) Int. Cl.
*G06F 8/61* (2018.01)
*G06F 9/4401* (2018.01)
(52) U.S. Cl.
CPC .............. *G06F 8/61* (2013.01); *G06F 9/4406* (2013.01)
(58) Field of Classification Search
CPC .. G06F 8/60–64; G06F 9/4406; G06F 3/0604; G06F 3/0629; G06F 3/0644; G06F 3/0689
See application file for complete search history.

(56) References Cited

U.S. PATENT DOCUMENTS 7,234,053 B1\* 6/2007 Mahmoud ............. G06F 9/4416
713/176
10,831,464 B2\* 11/2020 Lang ..................... G11B 20/10
(Continued)

FOREIGN PATENT DOCUMENTS

CN 101876885 A 11/2010
CN 102479163 A 5/2012
(Continued)

OTHER PUBLICATIONS

Machine Translation of CN103677887, Espacenet [online], 2020 [retrieved Oct. 10, 2020], Retrieved from Internet: <URL: https://worldwide.espacenet.com/publicationDetails/description?CC=CN&NR=103677887A&KC=A&FT=D&ND=3&date=20140326&DB=EPODOC&locale=en_EP>, pp. 1-17.\*
"Harddisk serial number from terminal?," Unix & Linux Stack Exchange Website, Available Online at https://unix.stackexchange.com/questions/121757/harddisk-serial-number-from-terminal, Nov. 9, 2015, 6 pages.
(Continued)

*Primary Examiner* — Todd Aguilera
(74) *Attorney, Agent, or Firm* — McCoy Russell LLP (57) ABSTRACT

The disclosure provides a method and device for installing an operating system. According to an example of the method, in a temporary system, a target physical hard disk to be used for installing the operating system is determined in response to a user operation of specifying the physical hard disk, and it is judged whether the temporary system and the operating system to be installed are of the same type. Then, in a system stage corresponding to a judgment result, a logical drive letter of the target physical hard disk on the operating system to be installed is queried by a query means corresponding to the judgment result. In this way, in a small system for the operating system to be installed, the operating system to be installed can be installed on the target physical hard disk identified by the logical drive letter.

15 Claims, 4 Drawing Sheets (56) References Cited

U.S. PATENT DOCUMENTS

| | | | |
|---|---|---|---|
| 2004/0148498 | A1 | 7/2004 | Circenis et al. |
| 2005/0198629 | A1 | 9/2005 | Vishwanath |
| 2006/0155749 | A1 | 7/2006 | Shankar et al. |
| 2012/0096545 | A1 | 4/2012 | Koeda |
| 2015/0271014 | A1 | 9/2015 | Madama |
| 2016/0132261 | A1 | 5/2016 | Matsutani |
| 2020/0210088 | A1* | 7/2020 | Di .................. G06F 3/0644 |
| 2020/0272445 | A1* | 8/2020 | Lang .................. G11B 20/10 |

FOREIGN PATENT DOCUMENTS

| | | |
|---|---|---|
| CN | 103677887 A | 3/2014 |
| CN | 103853664 A | 6/2014 |
| CN | 104699423 A | 6/2015 |
| CN | 101876885 B | 11/2015 |
| CN | 105183521 A | 12/2015 |
| JP | H04188220 A | 7/1992 |
| WO | 2011027476 A1 | 3/2011 |

OTHER PUBLICATIONS

ISA State Intellectual Property Office of the People's Republic of China, Written Opinion of the International Searching Authority Issued in Application No. PCT/CN2018/097214, dated Nov. 5, 2018, WIPO, 9 pages.

European Patent Office, Extended European Search Report Issued in Application No. 18838841.7, dated Jul. 3, 2020, Germany, 8 pages.

ISA State Intellectual Property Office of the People's Republic of China, International Search Report Issued in Application No. PCT/CN2018/097214, dated Nov. 5, 2018, WIPO, 4 pages.

State Intellectual Property Office of the People's Republic of China, Office Action and Search Report Issued in Application No. 201710632057.7, dated Dec. 4, 2019, 11 pages. (Submitted with Partial Translation).

Japanese Patent Office, Office Action Issued in Application No. 2020-504156, dated Mar. 30, 2021, 8 pages. (Submitted with Machine Translation).

European Patent Office, Office Action Issued in Application No. 18838841.7, dated Apr. 1, 2021, Germany, 5 pages.

* cited by examiner

OPERATING SYSTEM INSTALLATION

CROSS REFERENCE TO RELATED APPLICATIONS

The present application is a U.S. National Phase of International Patent Application Serial No. PCT/CN2018/097214 entitled "OPERATING SYSTEM INSTALLATION," filed on Jul. 26, 2018. International Patent Application Serial No. PCT/CN2018/097214 claims priority to Chinese Patent Application No. 201710632057.7, filed on Jul. 28, 2017. The entire contents of each of the above-cited applications are hereby is incorporated by reference in their entirety for all purposes.

BACKGROUND

In a WINDOWS™ system, mounting can be understood as assigning a drive letter to a disk partition, and the mount point is equivalent to a disk in a WINDOWS™ system, such as Disk0, Disk1, Disk2, and so on. In a LINUX™ system, mounting can be understood as hooking a device (such as a storage device) into an existing directory, and the mount point is equivalent to an entry directory of the disk file system in the LINUX™ system, such as sda, sdb, sdc.

When installing an operating system such as LINUX™ or WINDOWS™, the operating system is installed by default on a disk with a capacity greater than 80 GB (in gigabytes) and mounted first. For example, the LINUX™ system is installed by default on the disk sda, and the WINDOWS™ system is installed by default on the disk Disk0.

When installing an operating system such as Linux or Windows, the operating system is installed by default on a disk with a capacity greater than 80 GB (in gigabytes) and mounted first. For example, the Linux system is installed by default on the disk sda, and the Windows system is installed by default on the disk Disk0.

DETAILED DESCRIPTION OF THE EXAMPLES

Exemplary implementations will be described in detail herein with the examples thereof expressed in the drawings. When the following descriptions involve the drawings, like numerals in different drawings represent like or similar elements unless stated otherwise. The implementations described in the following exemplary examples do not represent all implementations consistent with the present disclosure. On the contrary, they are examples of an apparatus and a method consistent with some aspects of the present disclosure described in detail in the appended claims.

The terminology used in the present disclosure is for the purpose of describing a particular example only, and is not intended to limit the present disclosure. The singular forms such as "a", 'said", and "the" used in the present disclosure and the appended claims are also intended to include multiple, unless the context clearly indicates otherwise. It shall be also understood that the term "and/or" as used herein refers to any or all possible combinations that include one or more associated recited items.

It should be appreciated that although different information may be described using the terms such as first, second, third, etc. in the present disclosure, such information should not be limited to these terms. Such terms are used only to distinguish the same type of information from each other. For example, without departing from the scope of the present disclosure, the first information may also be referred to as the second information and similarly, the second information may also be referred to as the first information. Depending on the context, the word "if" as used herein may be interpreted as "when" or "as" or "determining in response to".

When an operating system is installed, each of the mount points can be traversed in order. For example, when a LINUX™ system is installed, entry directories sda, sdb, sdc . . . can be traversed; and when a WINDOWS™ system is installed, disks Disk0, Disk1, Disk2 . . . can be traversed. Then, a first hard disk with a capacity greater than 80 GB may be selected as a mount point, and the operating system may be installed on the hard disk. A user may learn which hard disk the operating system is installed on by viewing the mounting order of each of the hard disks through the BIOS (Basic Input Output System). Moreover, if the order of the mount points changes, for example, due to hot-plugging of the hard disk after the operating system is installed, the user will not know which hard disk has an operating system installed and which hard disk is a data disk not having an operating system installed. Thus, subsequent management of the hard disk is difficult, and it is easy to destroy data in a system disk and a data disk.

To this end, the present disclosure provides an operating system installation scheme, which can install the operating system on a specified hard disk, thereby facilitating identification of the system disk.

Currently, a mainstream operating system mainly includes a LINUX™ system and a WINDOWS™ system. Therefore, take the two operating systems as an example to describe the method provided by the present disclosure. However, in consideration of the diversity of an operating system and the possibility of more new operating systems in the future, this disclosure does not limit the specific type of an operating system.

A method for installing an operating system provided by an example of the present disclosure is described below.

The method can be applied to a computer or a server (hereinafter referred to as a target device) having an operating system installation requirement, and the method can be applied to at least the following three scenarios:

1. Install an operating system on a target device not having any operating system installed.

2. Install an operating system on the target device having an operating system installed to form a dual system;

3. Reinstall an operating system having been installed on the target device.

Figure 1:
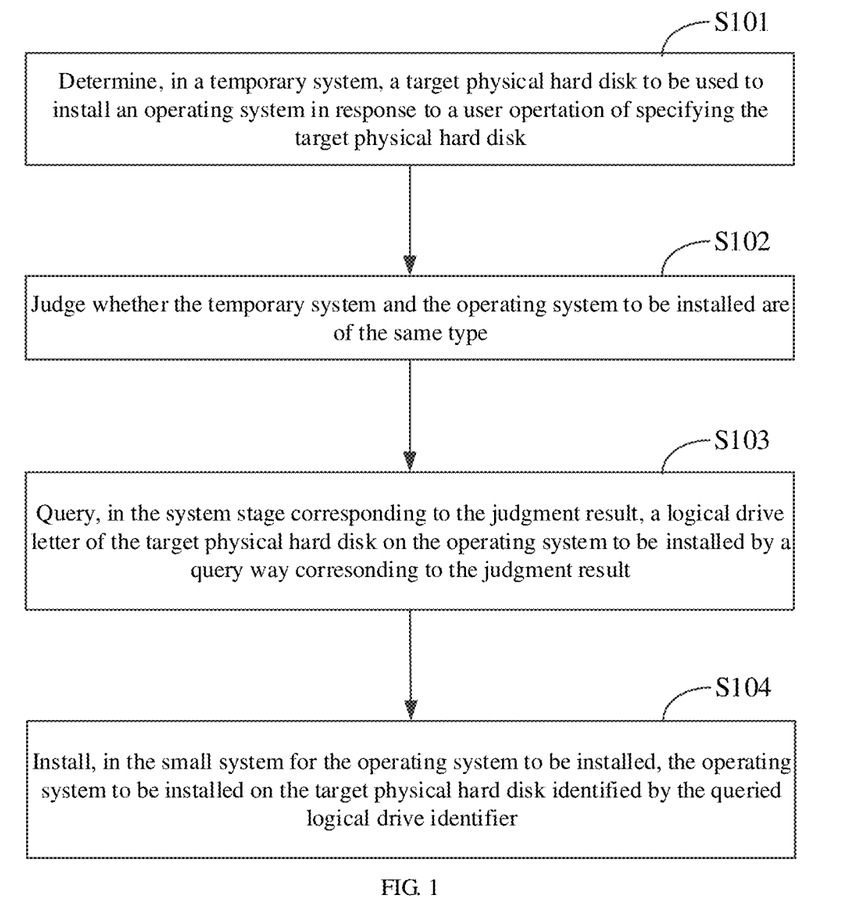
FIG. 1 is a schematic flowchart of a method for installing an operating system according to an example of the present disclosure.

Regardless of the scenario in which it is applied, the operational flow of the method is similar. FIG. 1 is a flow chart of a method provided by the present disclosure. As shown in FIG. 1, the method may include blocks 101-104 and involves two system phases: a temporary system and a small system for an operating system to be installed. Blocks 101 and 102 are executed in the temporary system, and Block 104 is executed in the small system. Block 103 may be executed in a temporary system or in the small system, which is decided by a judgement result of block 102. Next, the various blocks involved in the method are introduced.

Block 101: in a temporary system, a target physical hard disk to be used to install an operating system may be determined in response to a user operation of specifying the target physical hard disk.

In the present disclosure, a target device where an operating system is to be installed may first start a temporary system. The temporary system can be considered as a tool for installing an operating system, and can be, for example, a LINUX™ system, a WINDOWS™ system, or the like.

In the temporary system, the target device can receive a user instruction through its own external interface, and determine on which physical hard disk the operating system is to be installed. The external interface can be a graphical interface, a command line interface, a human-machine interface, or other form of interface. For example, a user can specify a target physical hard disk to install the operating system by entering a slot number of the physical hard disk.

Block 102: a type of the operating system to be installed may be determined, and whether the temporary system and the operating system to be installed are of the same type may be judged.

Take the common LINUX™ system and WINDOWS™ system as an example. Since both the temporary system and the operating system to be installed may be either a LINUX™ system or a WINDOWS™ system, there are four types of judgment results:

1. Install a WINDOWS™ system through a WINDOWS™ system, that is, the operating system to be installed is a WINDOWS™ system, and the temporary system and the operating system to be installed are of the same type;

2. Install a WINDOWS™ system through a LINUX™ system, that is, the operating system to be installed is a WINDOWS™ system, and the temporary system and the operating system to be installed are of different types;

3. Install a LINUX™ system through a LINUX™ system, that is, the operating system to be installed is a LINUX™ system, and the temporary system and the operating system to be installed are of the same type;

4. Install a LINUX™ system through a WINDOWS™ system, that is, the operating system to be installed is a LINUX™ system, and the temporary system and the operating system to be installed are of different types.

Block 103: in the system stage corresponding to the judgment result, a logical drive letter of the target physical hard disk on the operating system to be installed may be queried by using a query way corresponding to the judgment result.

On a LINUX™ system, a logical drive letter of a physical hard disk can be represented by sda, sdb, etc. In a WINDOWS™ system, a logical drive letter of a physical hard disk can be represented by Disk0, Disk1, and the like.

There are many ways to query the logical drive letter of the physical hard disk on the operating system to be installed in blocks 103. Two ways among them are briefly introduced here.

Figure 2A:
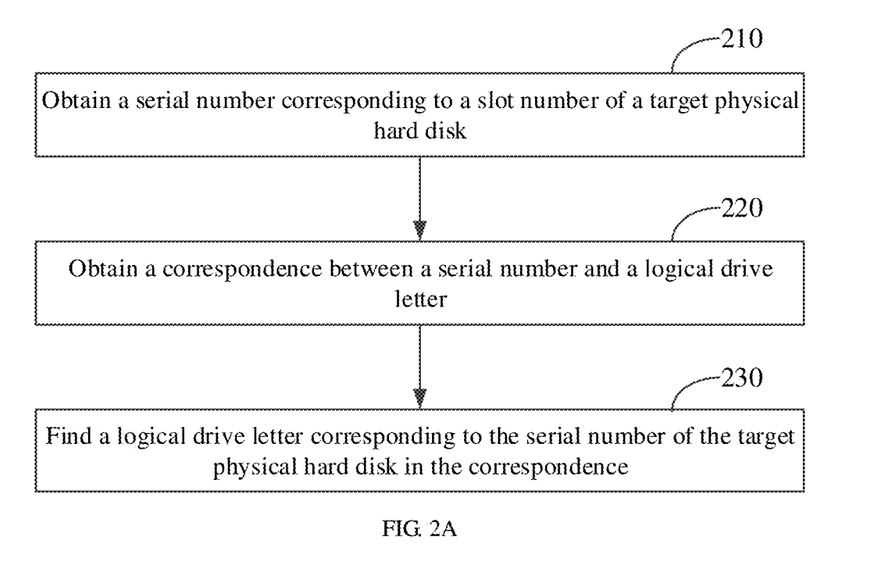
FIG. 2A is a schematic flowchart of a method for querying a logical drive letter of a physical hard disk on an operating system to be installed according to an example of the present disclosure.

As shown in FIG. 2A, the first query way may include the following blocks. Block 210: a serial number corresponding to a slot number of a target physical hard disk is obtained; block 220: a correspondence between a serial number and a logical drive letter is obtained; block 230: a logical drive letter corresponding to the serial number of the target physical hard disk is found in the correspondence. Wherein, although the illustrated block 210 is performed prior to block 220, those skilled in the art will appreciate that block 210 may also be performed after block 220 or concurrently, as long as both are performed prior to block 230.

As an example, a target device where an operating system is to be installed may obtain, after receiving a slot number of a target physical hard disk through an external interface, a serial number corresponding to the slot number by arcconf tool (or hdparm tool), and obtain a correspondence between a serial number and a logical drive letter by smartctl tool.

Figure 2B:
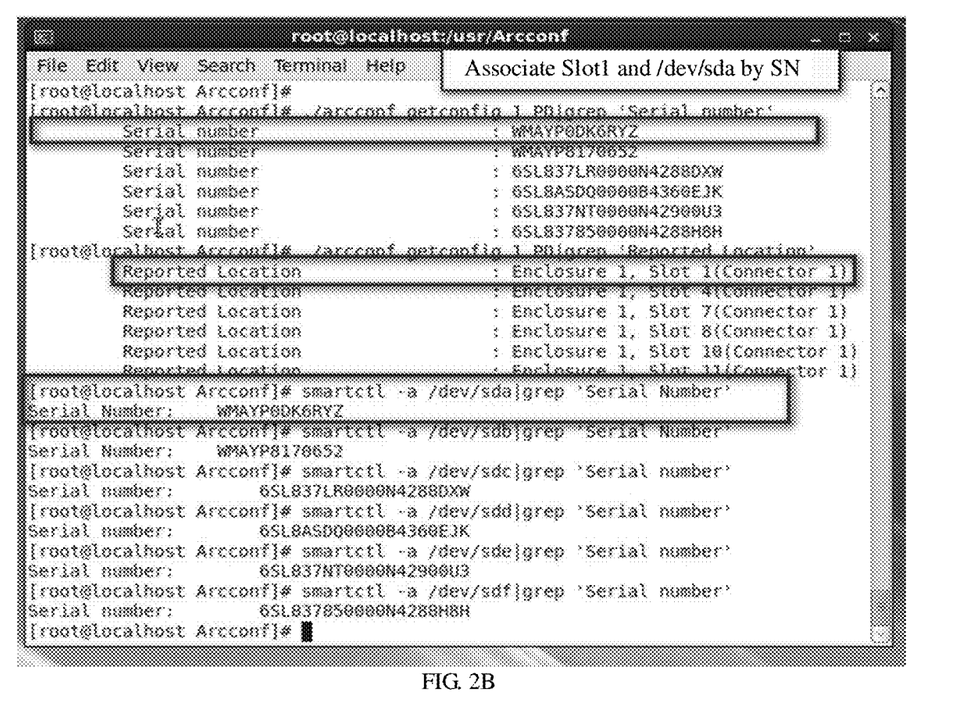
FIG. 2B is a schematic diagram of obtaining a serial number, a physical location, and a correspondence between a serial number and a logical drive letter of a physical hard disk according to an example of the present disclosure.

Take the LINUX™ system as an example. Referring to FIG. 2B, when "arcconf getconfig 1 PD|grep 'Serial number'" is entered in a command line interface of the LINUX™ system, serial numbers of all physical hard disks attached to a first controller card in the present LINUX™ system are obtained. As can be seen from FIG. 2B, the first controller card includes six hard disk serial numbers such as "WMAYP0DK6RYZ" and "WMAYP8170652". When "acconf getconfig 1 PD|grep 'Reported location'" is entered in the command line interface of the LINUX™ system, physical locations of all physical hard disks attached to the first controller card in the present LINUX™ system are obtained. As can be seen from FIG. 2B, enclosure IDs of the six physical hard disks included in the first controller card are all 1, and slot IDs thereof are 1, 4, 7, 8, 10, and 11, respectively.

According to the serial numbers and physical locations of all the physical hard disks attached to the first controller card, a correspondence between the slot numbers and the serial numbers of all the physical hard disks can be obtained. For example, as can be seen in FIG. 2B, the physical hard disk in slot number 1 has a serial number "WMAYP0DK6RYZ", and the physical hard disk in slot number 4 has a serial number "WMAYP8170652".

Next, a correspondence between each logical drive letter and the serial number can be queried in turn, and then a logical drive letter that matches the serial number of the target physical hard disk can be found as a logic drive letter of the physical hard disk specified by the user from the correspondence between the logical drive letter and the serial number. For example, suppose the slot number of the target physical hard disk specified by the user to be used to install the operating system is 1. By referring to the first two acconf command lines in FIG. 2B, it can be known that the serial number of the physical hard disk in slot number 1 is "WMAYP0DK6RYZ". Then, "smartctl-a/dev/sda|grep 'Serial Number'" is entered in the command line interface in the LINUX™ system, and it is found that a serial number corresponding to the logical drive letter sda happens to be "WMAYP0DK6RYZ". Thus, it can be determined that the physical hard disk in slot number 1 specified by the user has a logical drive letter sda on the LINUX™ system.

It should be noted that the first query way can only determine the logical drive letter of the physical hard disk specified by the user in the current system phase, because the logical drive letter of the physical hard disk is determined based on the serial number of the physical hard disk. Herein, the current system phase can be either a LINUX™ system or a WINDOWS™ system. Since the temporary system may be of the same type as the operating system to be installed, or it may be of a different type, it is necessary to pay attention to the use occasion of the first query way.

For example, if the temporary system is the same type as the operating system to be installed, no matter whether in the temporary system stage or in the small system stage of the operating system to be installed, the logical drive letters determined by the first query way are the same. Therefore, in this case, it may be arbitrarily selected to query the logical drive letter of the target physical hard disk on the operating system to be installed by the first query way in the temporary system, or query the logical drive letter of the target physical hard disk on the operating system to be installed by the first query way in the small system for the operating system to be installed.

For example, when the temporary system is of a different type from the operating system to be installed, if the first query way is used in the temporary system, the query result will be the logical drive letter of the target physical hard disk on the temporary system, and the logic drive letter is unrecognizable for the small system for the operating system to be installed. In order to avoid the installation failure of the operating system due to that the small system for the operating system to be installed cannot identify the queried logic drive letter, when the temporary system is of a different type from the operating system to be installed, the first query way is used in the small system phase of the operating system to be installed to determine the logical drive letter of the target physical hard disk on the operating system to be installed.

Figure 3A:
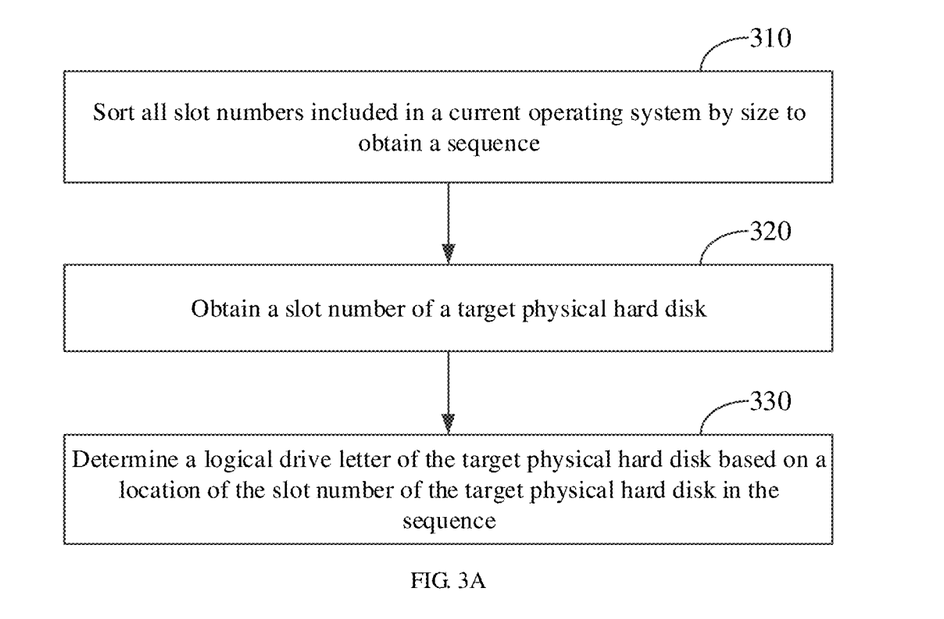
FIG. 3A is a schematic flowchart of a method for querying a logical drive letter of a physical hard disk on an operating system to be installed according to another example of the present disclosure.

As shown in FIG. 3A, the second query way may include the following blocks. Block 310: all slot numbers included in a current operating system may be sorted by size to obtain a sequence; here, the current operating system indicates an operating system in which the second query way is executed, for example, if the second query way is executed in the temporary system, the current operating system is the temporary system, and if the second query way is executed in the small system for the operating system to be installed, the current operating system is the small system for the operating system to be installed; Block 320: a slot number 330 of a target physical hard disk may be obtained; and Block 330: location of the slot number of the target physical hard disk in the sequence may be determined, and a logical drive letter of the target physical hard disk may be determined according to the location. In block 310, the slot numbers may be sorted in ascending order of values of the slot numbers, or in a descending order. Moreover, although the illustrated block 310 is performed prior to block 320, those skilled in the art will appreciate that block 310 can also be performed after block 320 or concurrently, as long as both are performed prior to block 330.

Since the logic drive letter of the physical hard disk is determined based on the physical location of the physical hard disk such as a slot number, the second query way can only be used to query the logical drive letter of the target physical hard disk on the WINDOWS™ system. This is because, in the WINDOWS™ system, the logical drive letter of the physical hard disk can be expressed in the form of Disk*, and the value of * here is related to the position of the slot number of the physical hard disk in the above sequence. For example, in case of sorting the slot number values in an ascending order, if the slot number of the physical hard disk is ranked in the $N^{th}$ position in the above sequence, the logical drive letter of the physical hard disk is Disk(N−1).

Figure 3B:
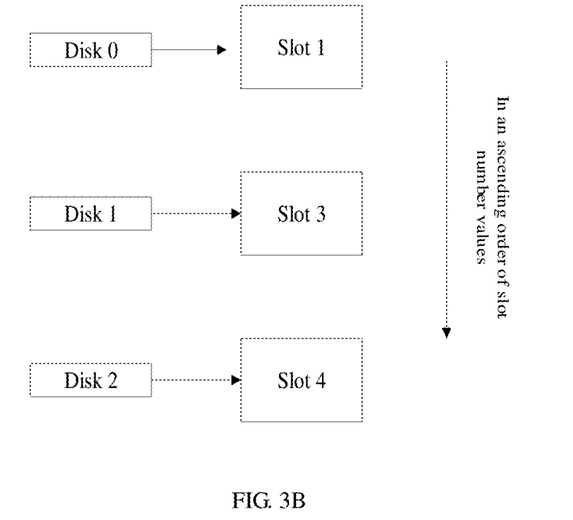
FIG. 3B is a schematic diagram of a correspondence between a slot number and a logical drive letter of a physical hard disk on a WINDOWS™ system according to another example of the present disclosure.

For example, referring to FIG. 3B, the slot numbers of all physical hard disks can be obtained by the arcconf tool and sorted in an ascending order of the slot number values. In FIG. 3B, the sequence of slot numbers is: slot number 1, slot number 3, and slot number 4. The slot number 1 is in the first place in the sequence, so the logical drive letter of the physical hard disk on slot number 1 is Disk0. Similarly, the logical drive letter of the physical hard disk on slot number 3 is Disk1, and the logical drive letter of the physical hard disk on slot number 4 is Disk2.

It should be noted that the physical location of the physical hard disk is fixed on premise that the hard disk is not hot-plugged by the user. In other words, the physical location (such as a slot number) of a physical hard disk included in the same device is fixed at different system stages. For example, the physical hard disk of a device in slot number 1 of the LINUX™ system is identical with the physical hard disk of the device in slot number 1 of the WINDOWS™ system. Since the logical drive letter of the physical hard disk on the WINDOWS™ system is related to the physical location of the physical hard disk, as long as the operating system to be installed is a WINDOWS™ system, the second query way can be used to determine the logical drive letter of the target physical hard disk on the WINDOWS™ system regardless of the type of the temporary system. Moreover, the disclosure does not limit the use occasion of the second query way. It may be possible to use the second query way to query, in the temporary system, the logical drive letter of the target physical hard disk on the WINDOWS™ system, or query, in the small system for the operating system to be installed, the logical drive letter of the target physical hard disk on the WINDOWS™ system.

Based on the above description, when the judgment result obtained in block 102 is "the operating system to be installed is a WINDOWS™ system, and the temporary system and the operating system to be installed are of the same type", in block 103, the following may be selected: in the temporary system, using the first query way or the second query way to query the logical drive letter of the target physical hard disk on the operating system to be installed; or, in the small system for the operating system to be installed, using the first query way or the second query way to query the logical drive letter of the target physical hard disk on the operating system to be installed.

Here, if it is selected to query the logical drive letter of the target physical hard disk in the small system for the operating system to be installed, the target device where the operating system is to be installed can modify the small system first, including: placing the arcconf tool and the smartctl tool involved in the first query way in the specified location of the small system, and storing the slot number of the target physical hard disk selected by the user in the boot file. Then, the current temporary system exits, and after shut down and restart, the small system for the operating system to be installed is entered, and corresponding blocks 210 to 230 are executed by the arcconf tool and the smartctl tool based on the instruction of the boot file to obtain the logical drive letter of the target physical hard disk.

When the judgment result obtained in block 102 is "the operating system to be installed is a WINDOWS™ system, and the temporary system and the operating system to be installed are of different types", in block 103, the following may be selected: in the small system for the operating system to be installed, using the first query way or the second query way to query the logical drive letter of the target physical hard disk on the operating system to be installed; or, in the temporary system, using the second query way to query the logical drive letter of the target physical hard disk on the operating system to be installed.

When the judgment result obtained in block 102 is "the operating system to be installed is a LINUX™ system, and the temporary system and the operating system to be installed are of the same type", in block 103, the following may be selected: in the temporary system, using the first query way to query the logical drive letter of the target physical hard disk on the operating system to be installed; or, in the small system for the operating system to be installed, using the first query way to query the logical drive letter of the target physical hard disk on the operating system to be installed.

When the judgment result obtained in block 102 is "the operating system to be installed is a LINUX™ system, and the temporary system and the operating system to be installed are of different types", in block 103, the following may be selected: in the small system for the operating system to be installed, using the first query way to query the logical drive letter of the target physical hard disk on the operating system to be installed.

After querying the logical drive letter of the target physical hard disk on the operating system to be installed, the target device can configure the logical drive letter into the automatic installation file. The automatic installation file is used to complete the automatic installation of the operating system, including configuration data such as user passwords. Based on the automatic installation file, the target device can perform block 104 to implement automatic installation of the operating system.

In block 104, in the small system for the operating system to be installed, the operating system to be installed is installed on the target physical hard disk identified by the queried logical drive identifier.

So far, the flow shown in FIG. 1 is completed.

It can be seen from the flow shown in FIG. 1 that in the present disclosure, the operating system can be installed on the hard disk selected by the user, which can facilitate the replacement and management of the system disk by the user. For example, since the specific system disk location is known, it can be avoided to install the operating system on the data disk when reinstalling the system.

Figure 4:
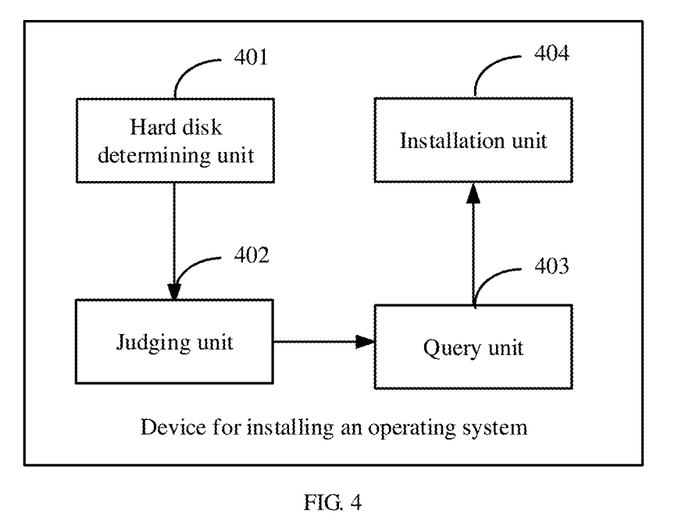
FIG. 4 is a schematic diagram illustrating functional blocks of a device for installing an operating system according to an example of the present disclosure.

Referring to FIG. 4, FIG. 4 is a functional block diagram of a device for installing an operating system according to an example of the present disclosure, which may include the following units:

A hard disk determining unit 401 is configured to determine, in a temporary system, a target physical hard disk to be used for installing an operating system in response to an operation of specifying the target physical hard disk.

A judging unit 402 is configured to judge, in the temporary system, the temporary system and the operating system to be installed are of the same type.

A query unit 403 is configured to query, in a system stage corresponding to the judgment result, a logical drive letter of the target physical hard disk on the operating system to be installed by a query way corresponding to the judgment result.

An installation unit 404 is configured to install, in a small system for the operating system to be installed, the operating system on the target physical hard disk identified by the logical drive identifier.

The query way may include the following two types.

The first query way is determining a logical drive letter of the target physical hard disk based on a serial number of the target physical hard disk: obtaining a serial number corresponding to the slot number of the target physical hard disk, obtaining a correspondence between a serial number and a logical drive letter, and finding a logical drive letter corresponding to the serial number of the target physical hard disk from the correspondence.

The second query way is determining a logical drive letter of the target physical hard disk based on a slot number of the target physical hard disk: sorting all slot numbers included in a current operating system in order of size to obtain a sequence, obtaining the slot number of the target physical hard disk; and determining a logical drive letter of the target physical hard disk according to a location of the slot number of the target physical hard disk in the sequence.

When the operating system to be installed is a WINDOWS™ system, and the temporary system and the operating system to be installed are of a same type, the query unit 403 may query, in the temporary system, a logical drive letter of the target physical hard disk on the operating system to be installed by the first query way or the second query way; or, query, in the small system for the operating system to be installed, the logical drive letter of the target physical hard disk on the operating system to be installed by the first query way or the second query way.

When the operating system to be installed is a WINDOWS™ system, and the temporary system and the operating system to be installed are of different types, the query unit 403 can select to query, in the small system for the operating system to be installed, the logical drive letter of the target physical hard disk on the operating system to be installed by the first query way or the second query way; or query, in the temporary system, the logical drive letter of the target physical hard disk on the operating system to be installed by the second query way.

When the operating system to be installed is a LINUX™ system, and the temporary system and the operating system to be installed are of a same type, the query unit 403 may select to query, in the temporary system, the logical drive letter of the target physical hard disk on the operating system to be installed by the first query way; or, query, in the small system for the operating system to be installed, the logical drive letter of the target physical hard disk on the operating system to be installed by the first query way.

When the operating system to be installed is a LINUX™ system, and the temporary system and the operating system to be installed are of different types, the query unit 403 can query, in the small system for the operating system to be installed, the logical drive letter of the target physical hard disk on the operating system to be installed by the first query way.

When the operating system to be installed is a Linux system, and the temporary system and the operating system to be installed are of different types, the query unit 403 can query, in the small system for the operating system to be installed, the logical drive letter of the target physical hard disk on the operating system to be installed by the first query way.

It should be noted that the division of the units in the example of the present disclosure is schematic, and is only a logical function division. In actual implementation, there may be another division manner. The functional units in the examples of the present disclosure may be integrated into one processing unit, or each unit may exist physically separately, or two or more units may be integrated into one unit. The above integrated unit can be implemented in the form of hardware or in the form of a software functional unit.

Figure 5:
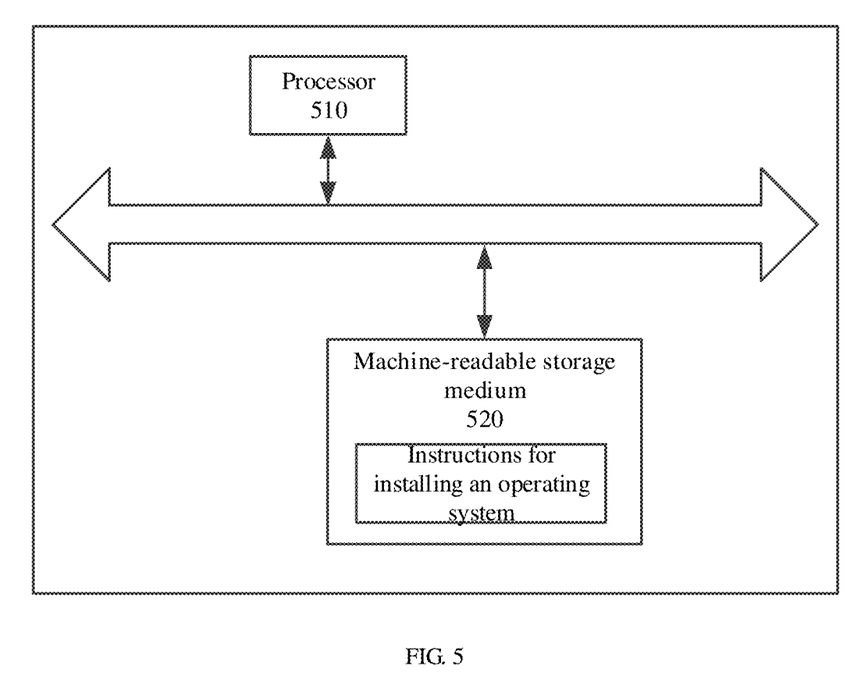
FIG. 5 is a schematic hardware structural diagram of a device for installing an operating system according to an example of the present disclosure.

The device for installing an operating system provided by the example of the present disclosure may include, at a hardware level, a processor 510 and a machine readable storage medium 520 as shown in FIG. 5. The machine readable storage medium 520 stores machine executable instructions executable by the processor 510, and the processor 510 executes the machine executable instructions to implement the method as shown in FIG. 1.

The machine-readable storage medium 520 can be any electronic, magnetic, optical, or other physical storage device that can contain or store information, such as executable instructions, data, and the like. For example, a machine-readable storage medium can be a volatile memory, a non-volatile memory, or similar storage medium. Specifically, the machine-readable storage medium 520 may be a RAM (Random Access Memory), a flash memory, a storage drive (such as a hard disk drive), a solid state drive, any type of storage disk (such as a compact disc, a DVD, etc.) or the combination thereof.

The invention claimed is:

1. A method of installing an operating system, comprising:
   determining, in a first system, a target physical hard disk to be used for installing the operating system in response to a user operation of specifying the target physical hard disk;
   judging, in the first system, whether the first system and the operating system to be installed are of a same type;
   querying a logical drive letter of the target physical hard disk on the operating system to be installed by a query way corresponding to the judgment result, wherein the query way comprises: determining a logical drive letter of the target physical hard disk based on a serial number of the target physical hard disk; determining a logical drive letter of the target physical hard disk based on a slot number of the target physical hard disk;
   installing, in a second system for the operating system to be installed, the operating system on the target physical hard disk identified by the logical drive letter.

2. The method of claim 1, wherein the determining the logical drive letter of the target physical hard disk based on the serial number of the target physical hard disk comprises:
   obtaining the serial number corresponding to the slot number of the target physical hard disk,
   obtaining a correspondence between the serial number and the logical drive letter,
   finding the logical drive letter corresponding to the serial number of the target physical hard disk from the correspondence.

3. The method of claim 1, wherein the determining the logical drive letter of the target physical hard disk based on the slot number of the target physical hard disk comprises:
   sorting all slot numbers included in a current operating system in order of size to obtain a sequence,
   obtaining the slot number of the target physical hard disk; and
   determining the logical drive letter of the target physical hard disk according to a location of the slot number of the target physical hard disk in the sequence.

4. The method according to claim 1, wherein when the operating system to be installed is a WINDOWS™ system, and the first system and the operating system to be installed are of a same type,
   the querying the logical drive letter of the target physical hard disk on the operating system to be installed by the query way corresponding to the judgment result, comprises any of the following:
   determining, in the first system, the logical drive letter of the target physical hard disk based on the serial number of the target physical hard disk;
   determining, in the first system, the logical drive letter of the target physical hard disk based on the slot number of the target physical hard disk;
   determining, in the second system for the operating system to be installed, the logical drive letter of the target physical hard disk based on the serial number of the target physical hard disk;
   determining, in the second system for the operating system to be installed, the logical drive letter of the target physical hard disk based on the slot number of the target physical hard disk.

5. The method according to claim 1, wherein when the operating system to be installed is a WINDOWS™ system, and the first system and the operating system to be installed are of different types,
   the querying the logical drive letter of the target physical hard disk on the operating system to be installed by the query way corresponding to the judgment result, comprises any of the following:
   determining, in the first system, the logical drive letter of the target physical hard disk based on the slot number of the target physical hard disk;
   determining, in the second system for the operating system to be installed, the logical drive letter of the target physical hard disk based on the serial number of the target physical hard disk;
   determining, in the second system for the operating system to be installed, the logical drive letter of the target physical hard disk based on the slot number of the target physical hard disk.

6. The method according to claim 1, wherein when the operating system to be installed is a LINUX™ system, and the first system and the operating system to be installed are of a same type,
   the querying the logical drive letter of the target physical hard disk on the operating system to be installed by the query way corresponding to the judgment result, comprises:
   determining, in the first system, the logical drive letter of the target physical hard disk based on the serial number of the target physical hard disk; or
   determining, in the second system for the operating system to be installed, the logical drive letter of the target physical hard disk based on the serial number of the target physical hard disk.

7. The method according to claim 1, wherein when the operating system to be installed is a LINUX™ system, and the first system and the operating system to be installed are of different types,
   the querying the logical drive letter of the target physical hard disk on the operating system to be installed by the query way corresponding to the judgment result, comprises:
   determining, in the second system for the operating system to be installed, the logical drive letter of the target physical hard disk based on the serial number of the target physical hard disk.

8. A device for installing an operating system, comprising:
   a non-transitory machine readable storage medium storing machine executable instructions;

a processor for executing the machine executable instructions to:

determine, in a first system, a target physical hard disk to be used for installing the operating system in response to a user operation of specifying the target physical hard disk, wherein the query way comprises: determining a logical drive letter of the target physical hard disk based on a serial number of the target physical hard disk; determining a logical drive letter of the target physical hard disk based on a slot number of the target physical hard disk;

judge, in the first system, whether the first system and the operating system to be installed are of a same type;

query a logical drive letter of the target physical hard disk on the operating system to be installed by a query way corresponding to the judgment result;

install, in a second system for the operating system to be installed, the operating system on the target physical hard disk identified by the logical drive letter.

9. The device of claim 8, wherein when determining the logical drive letter of the target physical hard disk based on the serial number of the target physical hard disk, the processor is further caused by the machine executable instructions to:

obtain the serial number corresponding to the slot number of the target physical hard disk, obtain a correspondence between the serial number and the logical drive letter, find the logical drive letter corresponding to the serial number of the target physical hard disk from the correspondence.

10. The device of claim 8, wherein when determining the logical drive letter of the target physical hard disk based on the slot number of the target physical hard disk, the processor is further caused by the machine executable instructions to:

sort all slot numbers included in a current operating system in order of size to obtain a sequence, obtain the slot number of the target physical hard disk; and determine the logical drive letter of the target physical hard disk according to a location of the slot number of the target physical hard disk in the sequence.

11. The device according to claim 8, wherein in case that the operating system to be installed is a WINDOWS™ system, and the first system and the operating system to be installed are of a same type, when querying the logical drive letter of the target physical hard disk on the operating system to be installed by the query way corresponding to the judgment result, the processor is further caused by the machine executable instructions to:

determine, in the first system, the logical drive letter of the target physical hard disk based on the serial number of the target physical hard disk;

determine, in the first system, the logical drive letter of the target physical hard disk based on the slot number of the target physical hard disk;

determine, in the second system for the operating system to be installed, the logical drive letter of the target physical hard disk based on the serial number of the target physical hard disk; or determine, in the second system for the operating system to be installed, the logical drive letter of the target physical hard disk based on the slot number of the target physical hard disk.

12. The device according to claim 8, wherein in case that the operating system to be installed is a WINDOWS™ system, and the first system and the operating system to be installed are of different types, when querying the logical drive letter of the target physical hard disk on the operating system to be installed by the query way corresponding to the judgment result, the processor is further caused by the machine executable instructions to:

determine, in the first system, the logical drive letter of the target physical hard disk based on the slot number of the target physical hard disk;

determine, in the second system for the operating system to be installed, the logical drive letter of the target physical hard disk based on the serial number of the target physical hard disk; or determine, in the second system for the operating system to be installed, the logical drive letter of the target physical hard disk based on the slot number of the target physical hard disk.

13. The device according to claim 8, wherein in case that the operating system to be installed is a LINUX™ system, and the first system and the operating system to be installed are of a same type, when querying the logical drive letter of the target physical hard disk on the operating system to be installed by the query way corresponding to the judgment result, the processor is further caused by the machine executable instructions to:

determine, in the first system, the logical drive letter of the target physical hard disk based on the serial number of the target physical hard disk; or determine, in the second system for the operating system to be installed, the logical drive letter of the target physical hard disk based on the serial number of the target physical hard disk.

14. The device according to claim 8, wherein in case that the operating system to be installed is a LINUX™ system, and the first system and the operating system to be installed are of different types, when querying the logical drive letter of the target physical hard disk on the operating system to be installed by the query way corresponding to the judgment result, the processor is further caused by the machine executable instructions to:

determine, in the second system for the operating system to be installed, the logical drive letter of the target physical hard disk based on the serial number of the target physical hard disk.

15. A non-transitory machine readable storage medium storing a plurality of machine executable instructions, the machine executable instructions being executable to:

determine, in a first system, a target physical hard disk to be used for installing an operating system in response to a user operation of specifying the target physical hard disk;

judge, in the first system, whether the first system and the operating system to be installed are of a same type;

query a logical drive letter of the target physical hard disk on the operating system to be installed by a query way corresponding to the judgment result, wherein the query way comprises: determining a logical drive letter of the target physical hard disk based on a serial number of the target physical hard disk; determining a logical drive letter of the target physical hard disk based on a slot number of the target physical hard disk;

install, in a second system for the operating system to be installed, the operating system on the target physical hard disk identified by the logical drive letter.

\* \* \* \* \*